(12) United States Patent
Yoshida et al.

(10) Patent No.: US 9,963,088 B2
(45) Date of Patent: May 8, 2018

(54) CONSTRUCTION FOR SECURING TRIM STRIP TO AUTOMOTIVE DOOR

(71) Applicant: Nishikawa Rubber Co., Ltd., Hiroshima (JP)

(72) Inventors: Sakiko Yoshida, Hiroshima (JP); Toshifumi Matsuura, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days. days.

(21) Appl. No.: 15/218,278

(22) Filed: Jul. 25, 2016

(65) Prior Publication Data

US 2017/0028938 A1   Feb. 2, 2017

(30) Foreign Application Priority Data

Jul. 28, 2015   (JP) ................................. 2015-148422

(51) Int. Cl.
| | |
|---|---|
| *B60R 13/04* | (2006.01) |
| *B60J 10/30* | (2016.01) |
| *B60J 10/76* | (2016.01) |
| *B60J 10/88* | (2016.01) |

(52) U.S. Cl.
CPC ............ *B60R 13/04* (2013.01); *B60J 10/30* (2016.02); *B60J 10/76* (2016.02); *B60J 10/88* (2016.02)

(58) Field of Classification Search
CPC ............ B60J 10/23; B60J 10/26; B60J 10/88
See application file for complete search history.

(56) References Cited

U.S. PATENT DOCUMENTS

| | | | | |
|---|---|---|---|---|
| 5,317,835 | A * | 6/1994 | Dupuy | B60J 10/235 49/377 |
| 5,743,047 | A * | 4/1998 | Bonne | B60J 10/00 49/441 |
| 6,679,003 | B2 * | 1/2004 | Nozaki | B60J 5/0402 49/441 |
| 7,093,393 | B2 * | 8/2006 | Hock | B60J 5/0402 296/146.9 |
| 8,166,708 | B2 * | 5/2012 | Ellis | B60J 5/0402 49/441 |
| 8,302,350 | B2 * | 11/2012 | Lee | B60J 10/87 49/440 |
| 8,479,449 | B2 * | 7/2013 | Titz | B60J 10/78 49/440 |
| 2008/0030046 | A1 * | 2/2008 | Krause | B60J 10/79 296/146.2 |
| 2010/0095599 | A1 * | 4/2010 | Coldre | B60J 10/248 49/484.1 |
| 2013/0219799 | A1 * | 8/2013 | Takeuchi | B60J 10/04 49/472 |

(Continued)

FOREIGN PATENT DOCUMENTS

| | | |
|---|---|---|
| JP | 7195942 A | 8/1995 |
| JP | 2012-106715 A | 6/2012 |
| JP | 5248885 B2 | 7/2013 |

*Primary Examiner* — Katherine W Mitchell
*Assistant Examiner* — Catherine A Kelly
(74) *Attorney, Agent, or Firm* — Alston & Bird LLP

(57) ABSTRACT

A door flange 11*d* is provided with an outer protrusion 21*e* and an upper step 20*e*. A trim strip 40 includes: an exterior appearance portion 41; a fit portion 46 in which the outer protrusion 21*e* is inserted and fits; an engagement plate 43 engaging with the upper step 20*e* from above; and a lower abutting plate 44 abutting to the lower face of the door flange 11*d* from below.

8 Claims, 6 Drawing Sheets

(56) References Cited

U.S. PATENT DOCUMENTS

2013/0292965 A1* 11/2013 Prater .................. B60J 10/0091
 296/146.2
2017/0015183 A1* 1/2017 Nam ........................ B60J 10/88

* cited by examiner

INSIDE OF COMPARTMENT ← → OUTSIDE OF COMPARTMENT

INSIDE OF COMPARTMENT ←        → OUTSIDE OF COMPARTMENT

INSIDE OF COMPARTMENT ←         → OUTSIDE OF COMPARTMENT

CONSTRUCTION FOR SECURING TRIM STRIP TO AUTOMOTIVE DOOR

CROSS-REFERENCE TO RELATED APPLICATION

This application claims priority to Japanese Patent Application No. 2015-148422 filed on Jul. 28, 2015, the entire disclosure of which as is incorporated by reference herein.

BACKGROUND

The present disclosure relates to, for example, a construction for securing a trim strip to an automotive door disposed on a side of a car. In particular, the present disclosure belongs to a technical field of a construction, which involves securing a trim strip to a window frame.

Doors provided to a side of a car include a door having a window frame holding a circumferential edge of a window glass, and a door having no window frame; that is, a door having a frameless window. In the case of a door having a window frame, the window frame has a sealing member disposed to seal a gap between a circumferential edge of an opening of a body of the car and a circumferential edge of the window frame. Furthermore, the window frame has a trim strip secured thereto from an outside of a compartment of the car.

Known examples of constructions of doors having a window frame are disclosed in various literatures such as Japanese Unexamined Patent Application No. 2012-106715, Japanese Patent No. 5248885, and Japanese Unexamined Patent Application No. H07-195942. A window frame in Japanese Unexamined Patent Application No. 2012-106715 has an upper frame edge extending along a roof of the body. The upper frame edge is provided with a door flange protruding toward an outside of the compartment. The door flange is provided with a sealing member covering the door flange from the outside of the compartment. The door flange has a recess formed on an upper face of a base end of the door flange. This recess receives a protruding outer periphery engaging portion provided to the sealing member.

Moreover, Japanese Patent No. 5248885 discloses a door flange provided to a window frame and protruding toward an outside of a compartment of a car. The door flange has an end, close to the outside of the compartment, bending to form a protrusion protruding upward. To this door flange, a metal trim strip is secured. The metal trim strip is molded out of a metal plate. The metal trim strip includes an exterior portion. An upper portion of the exterior portion is provided with an elastic securing edge shaped into a recess to house the protrusion of the door flange; whereas, a lower portion of the exterior portion is provided with a glass run holder.

Furthermore, the window frame in Japanese Unexamined Patent Application No. H07-195942 is provided with a door flange protruding toward an outside of a compartment of a car. This door flange has an end, close to the outside of the compartment, bending to form a protrusion protruding upward. In the configuration illustrated in FIG. 3 of this patent application, the door flange has a recess formed on an upper face of the door flange. Then, a trim strip is secured to the door flange to cover the door flange from the outside of the compartment. The trim strip has a protrusion formed to engage in the recess of the door flange.

Japanese Unexamined Patent Application No. 2012-106715 discloses a construction in which the outer periphery engaging portion of the sealing member engages in the recess formed on the base end of the door flange protruding toward the outside of the compartment. However, a tip of the door flange is merely inserted into the sealing member, and, in this construction, the tip fails to be secured to the sealing member. Hence, if external force is assumed to be applied to the sealing member when, for example, a window glass is closed, the sealing member could move away from a predetermined securing position such that an exterior appearance of the door becomes unattractive, and, in the worst case scenario, the sealing member could come off.

Moreover, in Japanese Patent No. 5248885, the trim strip could be secured to the protrusion on the tip of the door flange, but not to the base end of the door flange. Hence, if external force is assumed to be applied to the trim strip, the trim strip could move away from a predetermined securing position, and, in the worst case scenario, the trim strip could come off.

Furthermore, in the construction disclosed in Japanese Unexamined Patent Application No. H07-195942, the protrusion of the trim strip engages in the recess formed on the base end of the door flange. However, the protrusion is merely inserted into, and not secured to, the base end of the door flange. Hence, if external force is assumed to be applied to the trim strip, the trim strip could move away from a predetermined securing position, and, in the worst case scenario, the trim strip could come off.

SUMMARY

The present disclosure is conceived in view of the above problems, and intended to keep a trim strip from moving away from a predetermined securing position and maintain a good exterior appearance even if external force is applied to the trim strip when the trim strip is secured to a window frame from the outside of a compartment of a car. In addition, the present disclosure is intended to reduce a risk of the trim strip coming off.

In the present disclosure, an outer protrusion is formed on an end, of the door flange, close to the outside of the compartment, the outer protrusion protruding upward. An upper step is formed on an upper face of the door flange. A trim strip is provided with: a fit portion into which the outer protrusion of the door flange fits; an engagement portion engaging with the upper step of the door flange from above; and a lower abutting portion abutting to a lower face of the door flange from below.

A first aspect of the present disclosure is directed to a construction for securing a trim strip for an automotive door. The construction includes: a door flange provided to a window frame of the automotive door to protrude toward an outside of a compartment of a car; and the trim strip secured to the door flange from the outside of the compartment, the construction comprising: an outer protrusion formed on an end, of the door flange, close to the outside of the compartment, the outer protrusion protruding upward; an upper step formed on a portion, of an upper face of the door flange, closer to a base end of the door flange than the end on which the outer protrusion is formed, the upper step positioning the upper face of the door flange higher to the outside of the compartment than to an inside of the compartment; an exterior appearance portion facing the outside of the compartment and creating an appearance; a fit portion, provided to an upper portion of the exterior appearance portion, into which the outer protrusion is inserted and fits; an engagement portion extending from the fit portion to the upper step, and engaging with the upper step from above; and a lower abutting portion extending from a portion, of the exterior appearance portion, below the fit portion, and abutting to a lower face of the door flange from below, wherein the trim strip includes the exterior appearance portion, the fit portion, the engagement portion, and the lower abutting portion.

In accordance with this configuration, the outer protrusion and the upper step of the door flange are provided separately from each other in inside-outside direction of the compartment, and, accordingly, the fit portion and the engagement portion of the trim strip are also provided separately from each other in the inside-outside direction of the compartment. These separately provided elements allow multiple points, on the trim strip secured to the door flange, to be positioned with respect to the door flange. Then, when the lower abutting portion of the trim strip abuts to the lower face of the door flange, the fit portion and the engagement portion of the trim strip may simultaneously stay fitted and engaged. When external force is applied to the trim strip, such features may enable the fit portion of the trim strip to be left fitted into the outer protrusion of the door flange, and the engagement portion of the trim strip to be left engaged with the upper step of the door flange from above. Hence, this fitting and engagement may keep the trim strip from moving away from a predetermined securing position, and reduce a risk such as coming off of the trim strip.

A second aspect of the first aspect according to the present disclosure may include a lower step provided to the lower face of the door flange, the lower step being formed to position the lower face of the door flange higher to the outside of the compartment than to the inside of the compartment, wherein the lower abutting portion of the trim strip may abut to the lower step from the outside of the compartment.

In accordance with this configuration, the lower abutting portion of the trim strip abuts to the lower step of the door flange from the outside of the compartment, with the trim strip secured to the door flange. This abutment allows the lower abutting portion of the trim strip to be positioned with respect to the door flange, which makes it difficult for the trim strip to fall down when external force is applied to the trim strip, and reduces improper positioning of the trim strip.

A third aspect of the first aspect according to the present disclosure may include a sealing protrusion provided to an interior surface of the fit portion of the trim strip, the sealing protrusion making contact with the door flange and sealing a gap between the interior surface and the door flange.

This configuration may keep the outer protrusion of the door flange from touching, for example, rainwater, with the trim strip secured to the door flange, reducing a risk of causing rust on the door flange. Furthermore, this configuration may make it difficult for sounds, such as noise outside of the compartment, to enter the compartment. Simultaneously, the feature may reduce a rattle of the trim strip.

In a fourth aspect of the third aspect according to the present disclosure, the engagement portion of the trim strip may be made of a hard resin material harder than the sealing protrusion.

In accordance with this configuration, the engagement portion of the trim strip is made of hard resin. Such a feature may reduce unnecessary deformation of the engagement portion while the engagement portion engages with the upper step of the door flange, and allow the trim strip to be correctly positioned.

A fifth aspect of the first aspect according to the present disclosure may include a glass run secured to the trim strip, so that a circumferential edge of the window glass, disposed to freely rise and fall in the window frame, makes contact with the glass run.

In accordance with this configuration, the trim strip and the glass run are different parts, so that the trim strip and the glass run may be molded more freely.

A sixth aspect of the first aspect according to the present disclosure may include an introduction opening formed between the engagement portion and the lower abutting portion of the trim strip, the introduction opening introducing the outer protrusion of the door flange into the fit portion.

In accordance with this configuration, when the outer protrusion of the door flange is fitted into the fit portion of the trim strip, the outer protrusion is inserted into the introduction opening between the engagement portion and the lower abutting portion of the trim strip. As a result, the outer protrusion is introduced into the fit portion, contributing to an improvement in workability when the trim strip is secured.

According to the first aspect of the present invention, the outer protrusion, protruding upward is formed on an end, of the door flange, close to the outside of the compartment. The upper step is formed on an upper face of the door flange. The trim strip is provided with: the fit portion into which the outer protrusion of the door flange fits; the engagement portion engaging with the upper step of the door flange from above; and the lower abutting portion abutting to a lower face of the door flange from below. When external force is applied to the trim strip, such features may keep the trim strip from moving away from a predetermined securing position, maintain a good exterior appearance of a door, and furthermore, reduce a risk of the trim strip coming off.

According to the second aspect of the present invention, the lower abutting portion of the trim strip abuts to the lower step provided to the lower face of the door flange. Such a feature may make it difficult for the trim strip to fall down when external force is applied to the trim strip, and reduce improper positioning of the trim strip.

According to the third aspect of the present disclosure, the sealing protrusion is provided, to the interior surface of the fit portion of the trim strip, for sealing a gap between the interior surface and the door flange. Such a feature may keep the outer protrusion of the door flange from touching, for example, rainwater, and reduce a risk of causing rust on the door flange. In addition, the feature may make it difficult for sounds, such as noise outside of the compartment, to enter the compartment, contributing to offering a quieter environment in the compartment. Simultaneously, the feature may reduce a rattle of the trim strip.

According to the fourth aspect of the present invention, the engagement portion of the trim strip is made of a hard resin material so that the trim strip may be correctly positioned.

According to the fifth aspect of the present invention, the glass run may be separately provided to the trim strip, so that the trim strip and the glass run may be molded more freely.

According to the sixth aspect of the present invention, the introduction opening is formed between the engagement portion and the lower abutting portion of the trim strip to introduce the outer protrusion of the door flange into the fit portion. Such a feature may improve workability when the trim strip is secured.

DETAILED DESCRIPTION

Embodiments of the present disclosure will be described in detail below, with reference to the drawings. Note that the preferable embodiments below are essentially mere examples, and are not intended to limit the scope of, the application of, or the use of the present disclosure.

First Embodiment

Figure 1:
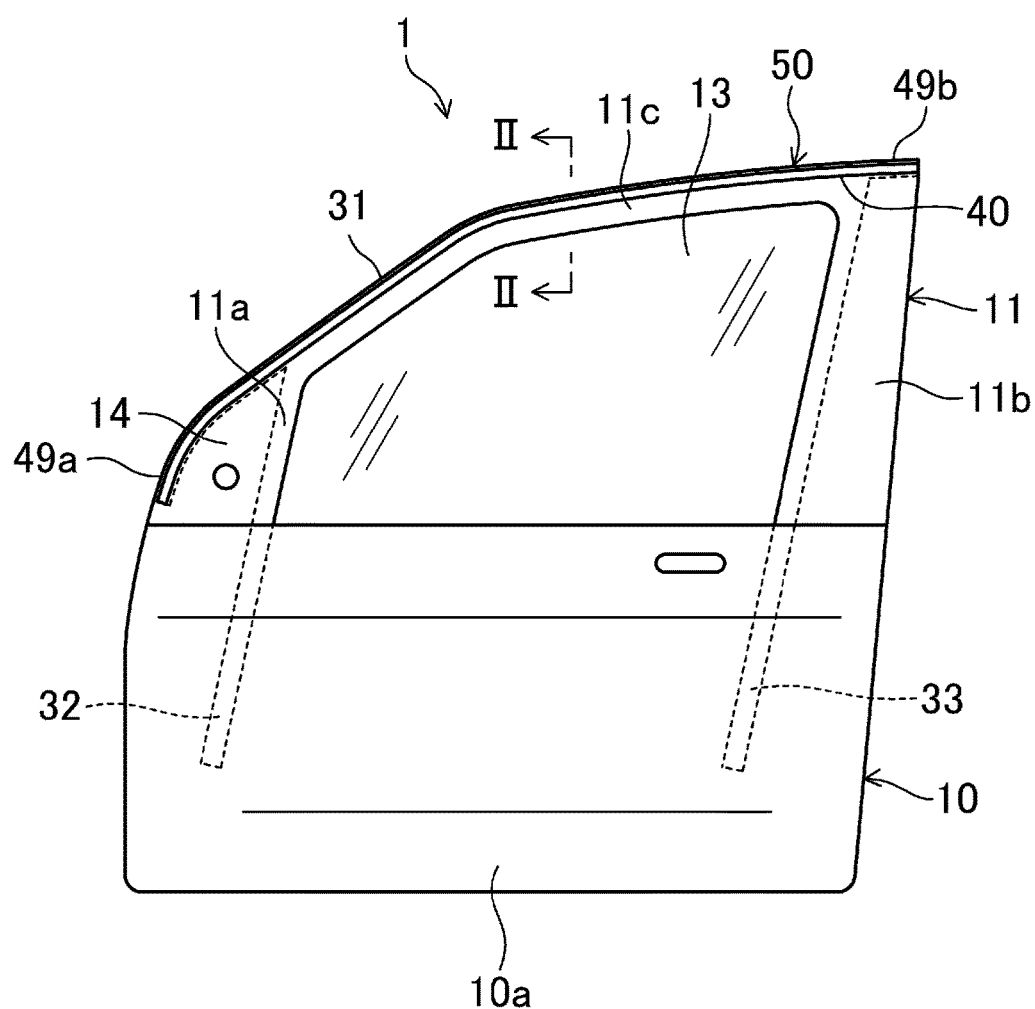
FIG. 1 is a side view of a front door, according to a first embodiment, seen from an outside of a compartment of a car.

FIG. 1 is a side view of a front door 1, of a car, seen from an outside of a compartment of the car. Adopted to the front door 1 is a construction for securing a trim strip to an automotive door according to a first embodiment of the present disclosure. Note that this embodiment discloses the front door 1 alone; however, the trim strip may be secured to a not-shown rear door using a similar securing construction. Moreover, in the description of this embodiment, the front and the rear of the car are simply referred to as the "front" and the "rear".

(Configuration of Door)

The front door 1 is disposed to a side of the car (not shown). The front door 1 opens and closes an opening (not shown) defined in the front, and to the side, of the car. The front door 1 includes a door body 10 which is a generally lower half of the front door 1, and a window frame 11 which is a generally upper half of the front door 1. Even though not shown, a front end of the door body 10 is secured to a pillar of the car body via a hinge having a vertically extending rotational pin. The door body 10 includes an inner panel (not shown) and an outer panel 10a made of, for example, a steel plate. The door body 10 houses, for example, a window glass 13 which rises and falls, and a window regulator (not shown) to raise and lower the window glass 13.

Figure 2:
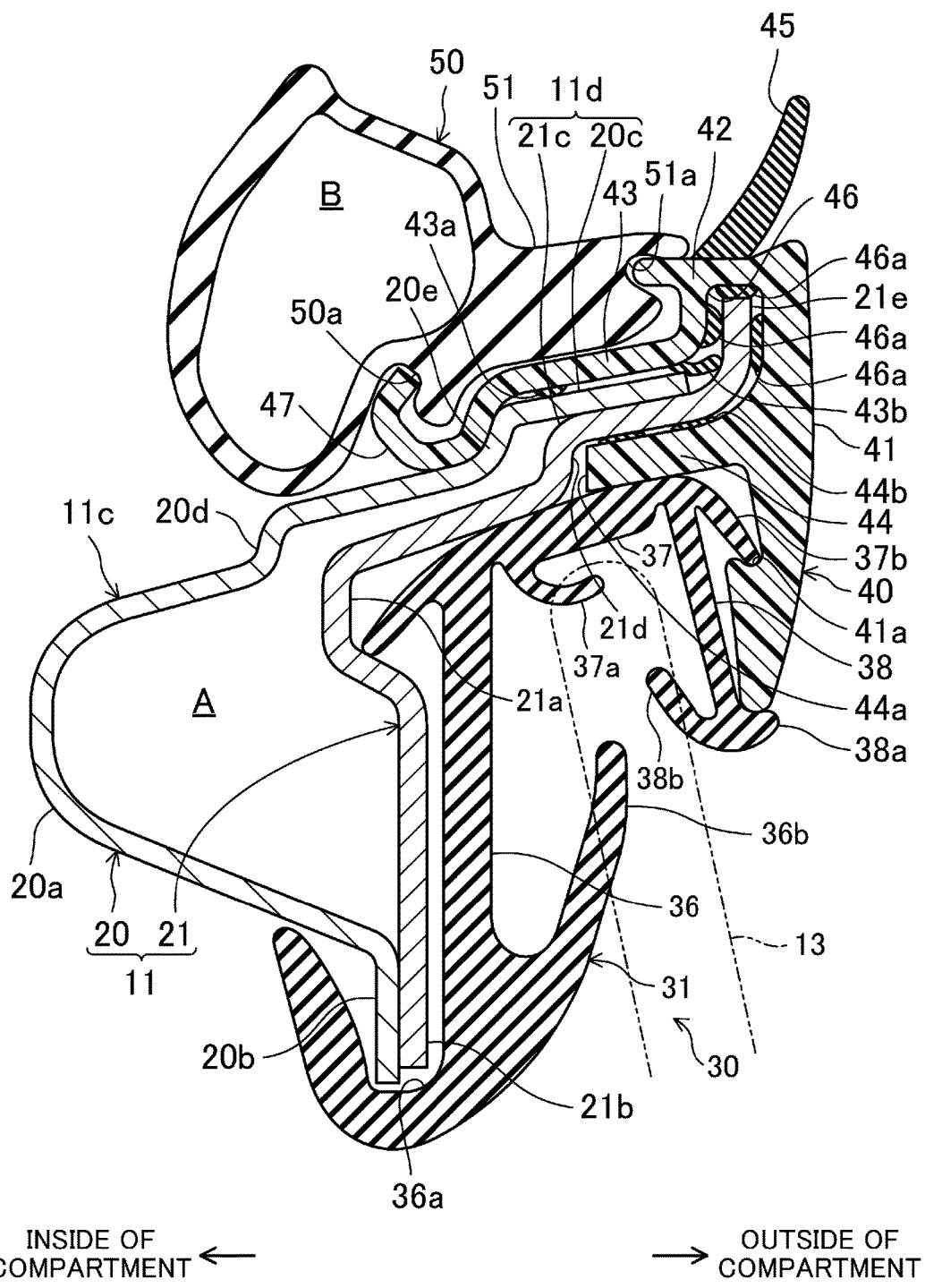
FIG. 2 is a cross-sectional view taken from line II-II of FIG. 1.

The window frame 11 functions as a sash to hold a circumferential edge of the window glass 13. As illustrated in FIG. 2, the window frame 11 according to this embodiment includes a combination of an inner panel 20 and an outer panel 21 made of, for example, a pressed metal plate. Note that the window frame 11 could be made by roll forming, for example. However, the window frame 11 may be made of a combination of the inner panel 20 and the outer panel 21 in terms of flexibility in designing a shape of the window frame 11. Moreover, the window frame 11 may include the inner panel 20 and the outer panel 21 both made of a resin material.

As illustrated in FIG. 1, the window frame 11 includes a front longitudinal frame edge 11a, a rear longitudinal frame edge 11b, and an upper frame edge 11c. The front longitudinal frame edge 11a extends upward from an upper front edge of the door body 10. The rear frame longitudinal edge 11b extends upward from an upper rear edge of the door body 10. The rear frame longitudinal edge 11b extends above the front longitudinal frame edge 11a. The upper frame edge 11c longitudinally extends, between a top end of the front longitudinal frame edge 11a and a top end of the rear frame longitudinal edge 11b, along an edge (not shown) of a roof of the body.

In front of the front longitudinal frame edge 11a of the window frame 11, a door mirror securing portion 14 is provided to extend upward from the door body 10. A not-shown door mirror is secured to the door mirror securing portion 14. An upper edge of the door mirror securing portion 14 is formed to lead to a front end of the upper frame edge 11c of the window frame 11. The upper edge slopes downward as extending toward the front.

Then, as illustrated in FIG. 2, a glass run 30 and a trim strip 40 are secured to the window frame 11. Through this trim strip 40, a weather strip 50 is also secured to the window frame 11.

As illustrated in FIG. 2, an inner bulge 20a is formed on a vertical middle of the inner panel 20. The inner bulge 20a bulges toward the inside of the compartment. The inner panel 20 is provided with an inner joining plate 20b formed below the inner bulge 20a to extend downward. Furthermore, the inner panel 20 is provided with an inner upper-plate 20c formed above the inner bulge 20a and extending toward the outside of the compartment. Overall, the inner upper-plate 20c gently slants upward as extending toward the outside of the compartment.

Moreover, the outer panel 21 has an outer bulge 21a formed in the vertical middle of the outer panel 21. The outer bulge 21a bulges, toward the inside of the compartment, less than the inner bulge 20a of the inner panel 20 does. A hollow A is formed between the outer panel 21 and the inner panel 20, so that the window frame 11 has a closed cross-section.

The outer panel 21 is provided with an outer joining plate 21b formed below the outer bulge 21a and extending downward along the inner joining plate 20b. This outer joining plate 21b and the inner joining plate 20b are joined together by, for example, welding.

Furthermore, the outer panel 21 is provided with an outer upper-plate 21c formed above the outer bulge 21a and extending toward the outside of the compartment. Overall, the outer upper-plate 21c gently slants upward as extending toward the outside of the compartment.

Toward the outside of the compartment, the inner upper-plate 20c and the outer upper-plate 21c vertically overlap with each other and are joined together by, for example, welding. The inner upper-plate 20c and the outer upper-plate 21c constitute the door flange 11d protruding toward the outside of the compartment.

An inner step 20d is formed on an upper face of the inner upper-plate 20c close to the inside of the compartment. An upper step 20e is formed closer to the outside of the compartment than this inner step 20d. The inner step 20d is formed to position the upper face of the door flange 11d higher to the outside of the compartment than to the inside of the compartment. Similarly, the upper step 20e is also formed to position the upper face of the door flange 11d higher to the outside of the compartment than to the inside of the compartment.

Moreover, on an end, of the door flange 11d, close to the outside of the compartment, an outer protrusion 21e is formed to protrude upward. The outer protrusion 21e is an upwardly bent outer end of the outer upper-plate 21c included in the door flange 11d. The outer protrusion 21e has an upper end protruding upward above the upper face of the inner upper-plate 20c.

Furthermore, a lower step 21d is formed on a lower face of the outer upper-plate 21c. The lower step 21d is formed to position the lower face of the door flange 11d higher to the outside of the compartment than to the inside of the compartment. This lower step 21d is formed on the outer upper-plate 21c in association with the formation of the upper step 20e on the inner upper-plate 20c. The lower step 21d is positioned closer to the outside of the compartment than the upper step 20e.

As can be seen, the inner step 20d, the upper step 20e, the lower step 21d, and the outer protrusion 21e are formed on the door flange 11d. Such a feature may reinforce, and enhance the stiffness of, the window frame 11. As described later in detail, this embodiment using the above construction for reinforcing the window frame 11 makes it possible for the trim strip 40 to be tightly secured.

(Configuration of Trim Strip)

The trim strip 40 is an elongated member to be secured to the upper frame edge 11c so as to longitudinally extend along the upper frame edge 11c of the window frame 11. For example, the trim strip 40 is formed to give a metallic touch to the front door 1. The trim strip 40 is made of, for example, hard resin (e.g., a mixture of thermoplastic resin olefin, such as polypropylene and polyethylene, and a large amount of reinforcing agent such as talc and glass fibers) an aluminum alloy, steel, and stainless steel.

Note that if the trim strip 40 is made of hard resin, a plated layer may be applied and a metal plate may be attached to a portion (an exterior appearance portion 41), of the trim strip 40, facing the outside of the compartment. Such a feature may give the trim strip 40a metallic touch.

The trim strip 40 is formed by, for example, extrusion molding. After the molding, the trim strip 40 extends generally linearly. When secured to the window frame 11, the trim strip 40 is bent round to conform to the curved form of the upper frame edge 11c.

Figure 3:
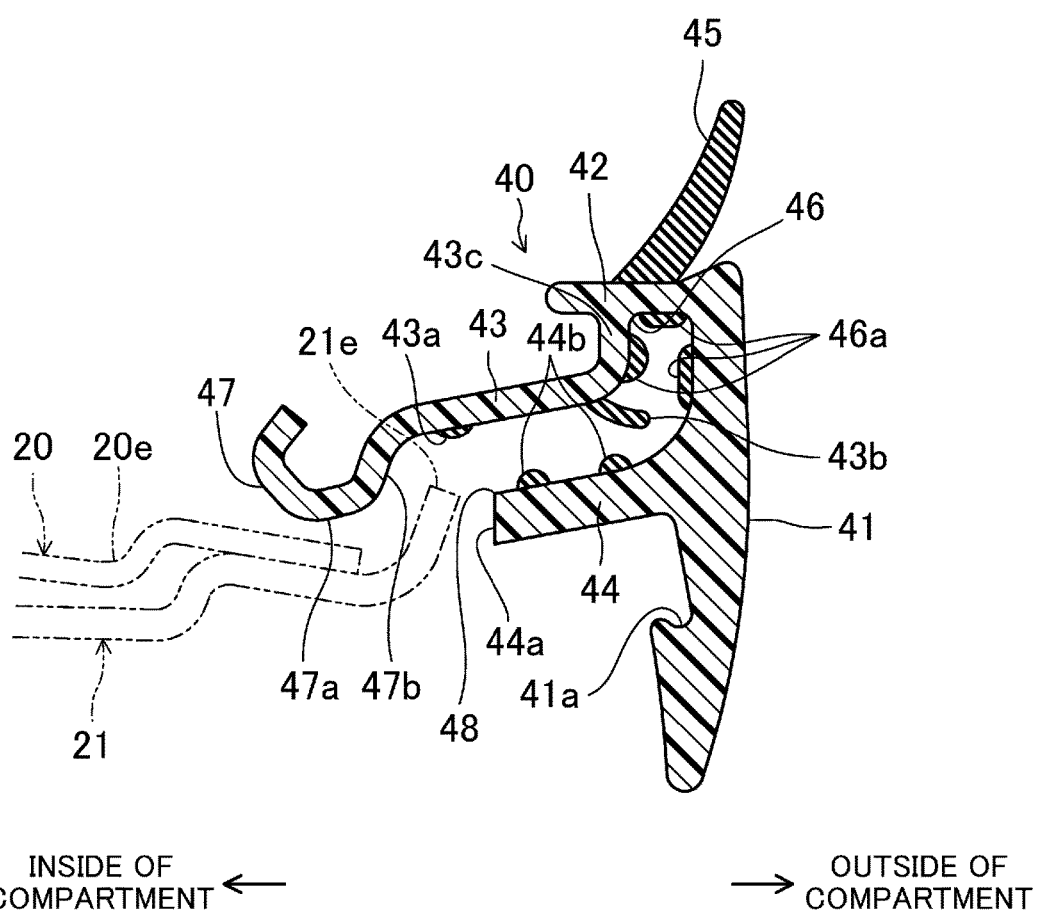
FIG. 3 is a cross-sectional view, of the trim strip, taken from line II-II of FIG. 1.

As illustrated in FIG. 3, the trim strip 40 includes: the exterior appearance portion 41 facing the outside of the compartment to create an appearance; a trim strip upper-plate 42 extending from an upper portion of the exterior appearance portion 41 toward the inside of the compartment; an engagement plate (an engagement portion) 43 protruding downward from the trim strip upper-plate 42 and extending toward the inside of the compartment; and a lower abutting plate (a lower abutting portion) 44. As illustrated in FIG. 2, the exterior appearance portion 41 is shaped into a plate and disposed to cover, from the outside of the compartment, the end of the door flange 11d close to the outside of the compartment. The exterior appearance portion 41 has an upper edge positioned above the upper end of the outer protrusion 21e of the door flange 11d. Moreover, when seen from the outside of the compartment, a lower edge of the exterior appearance portion 41 is positioned to completely cover an area in which the outer bulge 21a of the outer panel 21 is formed. The exterior appearance portion 41 has a smooth exterior face on the compartment. Meanwhile, the exterior appearance portion 41 is provided with a recess 41a in the vertical middle of an interior face, of the exterior appearance portion 41, on the compartment.

The trim strip upper plate 42 is formed to cover from above the outer protrusion 21e of the door flange 11d, and extends further to the inside of the compartment than the outer protrusion 21e does. An engagement plate 43 extends downward from the middle, in the inside-outside direction of the compartment, of the lower face of the trim strip upper plate 42. The engagement plate 43 then bends toward the inside of the compartment, and extends to the upper step 20e along the upper face of the door flange 11d. The engagement plate 43 engages with this upper step 20e from above. The engagement plate 43 covers an area ranging to the upper step 20e found on the upper face of the door flange 11d. Moreover, a bending plate 47 is formed on an end, of the engagement plate 43, close to the inside of the compartment.

The bending plate 47 engages with the upper step 20e of the door flange 11d. The bending plate 47 is formed to bend downward and then upward, and has a cross-section shaped similar to C opening upward overall. Then, illustrated with a reference character only in FIG. 3, a first abutting face is an area, (denoted by a reference character 47b) on an exterior face of this bending plate 47, toward the outside of the compartment. The first abutting face abuts to the upper step 20e of the door flange 11d from the inside of the compartment. Furthermore, a second abutting face is an area (denoted by a reference character 47a) provided on the exterior face of the bending plate 47 and found closer to the inside of the compartment than the first abutting face 47b. The second abutting face abuts, from above, to a portion, of the door flange 11d, slightly closer to the inside of the compartment than the upper step 20e. In addition, the engagement plate 43 is shaped to have the bending plate 47, of which cross-section is generally C-shaped, provided to an end of the engagement plate 43. Such a feature may make it difficult for the engagement plate 43 to be deformed.

The upper portion of the exterior appearance portion 41 is provided with a fit portion 46 into which the outer protrusion 21e of the door flange 11d is inserted and fits. The fit portion 46 is a portion surrounded by an upper portion of the exterior appearance portion 41, the trim strip upper plate 42, and a base (a portion protruding downward from the trim strip upper plate 42) of the engagement plate 43. The fit portion 46 is shaped into a recess so that the outer protrusion 21e is inserted into the fit portion 46 upward from below. This fit portion 46 has an interior surface provided with three sealing protrusions 46a making contact with the door flange 11d to seal a gap between the interior surface and the door flange 11d. Each of the sealing protrusions 46a is made of a waterproof elastic material. The material includes an elastic material softer than the above hard resin, such as thermoplastic elastomer including thermoplastic elastomer olefin (TPO) and thermoplastic elastomer styrene (TPS), and soft resin including polyvinyl chloride and nylon. These materials may be foamed. The sealing protrusions 46a are bonded to the interior surface of the fit portion 46. Furthermore, as illustrated in FIG. 2, the sealing protrusions 46a make contact with respective faces of the outer protrusion 21e of the door flange 11d; namely, a face close to the outside of the compartment, a face close to the inside of the compartment, and a face on the top end. The sealing protrusions 46a are then elastically deformed.

Moreover, a sealing protrusion 43a, similar to the protrusions 46a, is provided to the lower face, of the engagement plate 43, closer to the inside of the compartment. This sealing protrusion 43a makes contact with the upper face of the door flange 11d and is elastically deformed. A sealing protrusion 43b, shaped into a lip, is provided to the lower face, of the engagement plate 43, closer to the inside of the car.

Furthermore, a lower abutting plate 44 extends from a portion of the exterior appearance portion 41 below the fit portion 46. The lower abutting plate 44 extends toward the inside of the compartment along the lower face of the door flange 11d. The lower abutting plate 44 then abuts to the lower face of the door flange 11d from below. The lower abutting plate 44 is formed to have a tip face 44a, toward the inside of the compartment, face the lower step 21d of the door flange 11d. When external force is applied to the trim strip 40, the tip face 44a of the lower abutting plate 44 abuts to the lower step 21d from the outside of the compartment. Note that the tip face 44a of the lower abutting plate 44 may be formed to always abut to the lower step 21d. Moreover, the upper face of the lower abutting plate 44 is provided with a sealing protrusion 44b which makes contact with the lower face of the door flange 11d, and is elastically deformed.

Illustrated only in FIG. 3, an introduction opening 48 is formed between (i) the first abutting face 47b of the engagement plate 43 of the trim strip 40 and (ii) the tip face 44a of the lower abutting portion 44 of the trim strip 40. The introduction opening 48 introduces the outer protrusion 21e of the door flange 11d into the fit portion 46. When the trim strip 40 is ready to be secured as illustrated in FIG. 3, the introduction opening 48 opens on a lower face of the trim strip 40. Moreover, a lower side face of the bending plate 47 is positioned to be adjacent to an edge of the introduction opening 48. Since this bending plate 47 has a generally C-shaped cross-section as described above, the lower side face of the bending plate 47 is also curbed or bent. The lower side face of this bending plate 47 may guide the outer protrusion 21e of the door flange 11d toward the introduction opening 48.

Moreover, the trim strip upper plate 42 of the trim strip 40 has an upper side face provided with an upper lip 45 extending upward toward the outside of the car. This upper lip 45 is made of an elastic material similar to that of the sealing protrusion 43a.

(Configuration of Glass Run)

As illustrated in FIG. 2, the glass run 30 is secured to a lower portion of the door flange 11d, so that a circumferential edge of the window glass 13, disposed to freely rise and fall in the window frame 11, makes contact with the glass run 30. Specifically, the glass run 30 is an elongated member longitudinally extending along the upper frame edge 11c of the window frame 11. For example, the glass run 30 is made of an elastic and waterproof material such as ethylene-propylene-diene rubber (EPDM) and thermoplastic elastomer olefin (TPO).

As illustrated in FIG. 1, the glass run 30 includes: an upper glass run edge 31 extending along the upper frame edge 11c of the window frame 11; a front longitudinal glass run edge 32 extending along the front longitudinal frame edge 11a of the window frame 11; and a rear longitudinal glass run edge 33 extending along the rear frame longitudinal edge 11b of the window frame 11. The upper glass run edge 31, the front longitudinal glass run edge 32, and the rear longitudinal glass run edge 33 are integrated into one.

Lower portions of the front longitudinal glass run edge 32 and the rear longitudinal glass run edge 33 extend into the door body 10 to be positioned near a lower portion of the door body 10, and are held by a holding member (not shown) provided inside the door body 10. The front longitudinal glass run edge 32 and the rear longitudinal glass run edge 33 extend in the respective moving directions of the front edge and the rear edge of the window glass 13 in rising and falling. Hence, the front longitudinal glass run edge 32 and the rear longitudinal glass run edge 33 are slidably in contact with the front and rear edges of the window glass 13.

As illustrated in FIG. 2, the glass run 30, opening downward, includes: a vertical interior wall 36 vertically extending along a lower portion of the outer panel 21; an upper wall 37 extending from an upper end of the vertical interior wall 36 toward the outside of the compartment; and a vertical exterior wall 38 extending downward from an end, of the upper wall 37, close to the outside of the compartment. An insertion groove 36a is formed on a lower end, of the vertical interior wall 36, close to the inside of the compartment. The inner joining plate 20b of the inner panel 20 and the outer joining plate 21b of the outer panel 21 are inserted into, and engage with, the insertion groove 36a. Moreover, an interior sealing lip 36b is formed, on a lower end of the vertical interior wall 36, toward the outside of the compartment so as to extend upward. The interior sealing lip 36b makes contact with the interior surface, of the window glass 13, close to the compartment.

An upper sealing lip 37a is formed on a lower face of the upper wall 37 of the glass run 30 to extend toward the outside of the compartment. The upper sealing lip 37a makes contact with an upper edge of the window glass 13. This upper wall 37 extends from the door flange 11d to the lower abutting plate 44 of the trim strip 40, and has an upper face abut to a lower face of the lower abutting plate 44. Furthermore, the upper face of the upper wall 37 may also abut to the lower face of the door flange 11d. The upper wall 37 has an end, close to the inside of the compartment, protruding further toward the inside of the compartment than the upper end of the vertical interior wall 36. When the glass run 30 is secured to the window frame 11, the end of the upper wall 37 is inserted into the outer bulging 21a, and then engages with an exterior face of the outer bulging 21a. Toward the outside of the compartment, the upper wall 37 has an extending portion 37b formed to extend toward the outside of the compartment, and downward. The extending portion 37b has a tip fitting into an interior recess 41a of the exterior appearance portion 41 of the trim strip 40.

The vertical exterior wall 38 of the glass run 30 has a lower end provided with: an outside protrusion 38a protruding toward the outside of the compartment; and an outside sealing lip 38b protruding toward the inside of the compartment and making contact with an exterior face, of the window glass 13. The outside protrusion 38a has an upper portion so that a lower end of the exterior appearance portion 41 of the trim strip 40 may fit to the upper portion.

(Configuration of Weather Strip)

The weather strip 50 is not directly attached to the window frame 11. When secured to the trim strip 40, the weather strip 50 is to be secured to the window frame 11 likewise. The weather strip 50 extends toward the door body 10 along the outer periphery of the window frame 11, and is formed to surround the front door 1.

The entire weather strip 50 is made of an elastic material softer than the glass run 30. The weather strip 50 has a hollow B close to the inside of the compartment. Meanwhile, the weather strip 50 is provided with a solid thick-walled portion 51 toward the outside of the compartment. An inner fitting groove 50a is formed on the lower face of the weather strip 50. The upper end of the bending plate 47 of the trim strip 40 is inserted, and fits, into the inner fitting groove 50a. Moreover, an outer fitting groove 51a is formed on a face, of the thick-walled portion 51, toward the outside of the compartment. The end, of the trim strip upper plate 42, close to the inside of the compartment is inserted, and fits, into the outer fitting groove 51a. The thick-walled portion 51 has a lower face positioned adjacent to an upper face of the engagement plate 43.

(How to Secure Trim Strip)

Described next is how to secure the above-configured trim strip 40 to the door flange 11d. As illustrated in FIG. 3, the trim strip 40 is secured to the door flange 11d from the outside of the compartment. First, the trim strip 40 is disposed outside the compartment with respect to the door flange 11d, and the introduction opening 48 of the trim strip 40 is positioned to face the end, of the door flange 11d, close to the outside of the compartment; that is, the outer protrusion 21e. Then, as illustrated in imaginary lines, the outer protrusion 21e of the door flange 11d is inserted into the introduction opening 48 of the trim strip 40. Here, the trim strip 40 is elastically deformed so that the gap between the engagement plate 43 and the lower abutting plate 44 is increased and the introduction opening 48 is enlarged. Then, the outer protrusion 21e is inserted further into the introduction opening 48. As a result, as illustrated in FIG. 2, the outer protrusion 21e is inserted, and fits, into the fit portion 46. As soon as the outer protrusion 21e fits into the fit portion 46, the trim strip 40 resumes its original shape, and the first abutting face 47b of the bending plate 47 of the engagement plate 43 abuts from inside to the upper step 20e of the door flange 11d. From above, the second abutting face 47a of the bending plate 47 abuts to, and engages with, a portion, of the door flange 11d, slightly closer to the inside of the compartment than the upper step 20e. Simultaneously, the lower abutting plate 44 abuts to the lower face of the door flange 11d. Such features allow the door flange 11d to be vertically sandwiched between the engagement plate 43 and the lower abutting plate 44. This makes the outer protrusion 21e more difficult to disengage from the fit portion 46, and the bending plate 47 of the engagement plate 43 more difficult to disengage from the upper step 20e of the door flange 11d.

Moreover, the three sealing protrusions 46a of the fit portion 46 make contact with the outer protrusion 21e of the door flange 11d. The sealing protrusions 43a and 43b of the engagement plate 43 make contact with the upper face of the door flange 11d. The sealing protrusion 44b of the lower abutting plate 44 makes contact with the lower face of the door flange 11d.

Note that when glass run 30 is secured to the window frame 11, the inner joining plate 20b of the inner panel 20 and the outer joining plate 21b of the outer panel 21 are inserted into, and engaged with, the insertion groove 36a of the glass run 30. Simultaneously, the upper portion of the outside protrusion 38a is fitted to the lower portion of the exterior appearance portion 41 of the trim strip 40. Furthermore, the tip of the extending portion 37b is fitted into the recess 41a of the exterior appearance portion 41 of the trim strip 40.

Moreover, a front seal 49a is continued in front of the trim strip 40 to extend ahead of the front longitudinal glass run edge 32.

In addition, the front seal 49a is formed to extend along the upper edge of the door mirror securing portion 14.

Furthermore, a rear seal 49b is continued in back of the trim strip 40 to extend behind the rear longitudinal glass run edge 33.

Moreover, when the weather strip 50 is secured to the window frame 11, the upper end of the bending plate 47 of the trim strip 40 is fitted into the inner fitting groove 50a. Simultaneously, the end of the trim strip upper plate 42 is fitted into the outer fitting groove 51a.

Effects of First Embodiment

The above configuration makes it difficult for the outer protrusion 21e of the door flange 11d to disengage from the fit portion 46 of the trim strip 40. Simultaneously, the configuration makes it difficult for the bending plate 47—that is an end, of the engagement plate 43 of the trim strip 40, closer to the inside of the car—to disengage from the upper step 20e of the door flange 11d. Such features may keep the trim strip 40 from moving away from a predetermined securing position when external force is applied to the trim strip 40, maintain a good exterior appearance of the front door 1, and furthermore, reduce a risk of the trim strip 40 coming off.

Moreover, the lower abutting plate 44 of the trim strip 40 abuts to the lower step 21d provided to the lower face of the door flange 11d. Such a feature may makes it difficult for the trim strip 40 to fall down when external force is applied to the trim strip 40, and reduce improper positioning of the trim strip 40.

Furthermore, the trim strip 40 is provided with the sealing protrusions 43a, 44b, and 46a for sealing a gap between the trim strip 40 and the door flange 11d. Such a feature may keep the outer protrusion 21e of the door flange 11d from touching for example, rainwater, and reduce a risk of causing rust on the door flange 11d. In addition, the sealing protrusion 43b, shaped into a lip, is provided so as to elastically make contact with a base of the outer protrusion 21e of the door flange 11d. Such a feature may reduce a risk of causing rust also on the upper end, of the inner panel 20, close to the outside of the car. In addition, the feature may make it difficult for sounds, such as noise outside of the compartment, to enter the compartment, contributing to offering a quieter environment in the compartment. Furthermore, the feature may reduce a rattle of the trim strip 40 and the noise resulting from the rattle.

Moreover, the trim strip 40 is made of hard resin, such that the engagement plate 43 and the lower abutting plate 44 are made hard. Such a feature allows the trim strip 40 to be correctly positioned.

In addition, the glass run 30 may be separately provided to the trim strip 40. Such a feature may easily allow the trim strip 40 and the glass run 30 to be made of a different material. Although not shown, the separate glass run 30 beneficially makes a shape of molded die-formed portion in, for example, a corner of the body less complex.

Furthermore, the introduction opening 48 is formed between the lower abutting portion 44 and the bending plate 47 of the engagement plate 43 of the trim strip 40 to introduce the outer protrusion 21e of the door flange 11d into the fit portion 46. Such a feature may improve workability when the trim strip 40 is secured.

Second Embodiment

Figure 4:
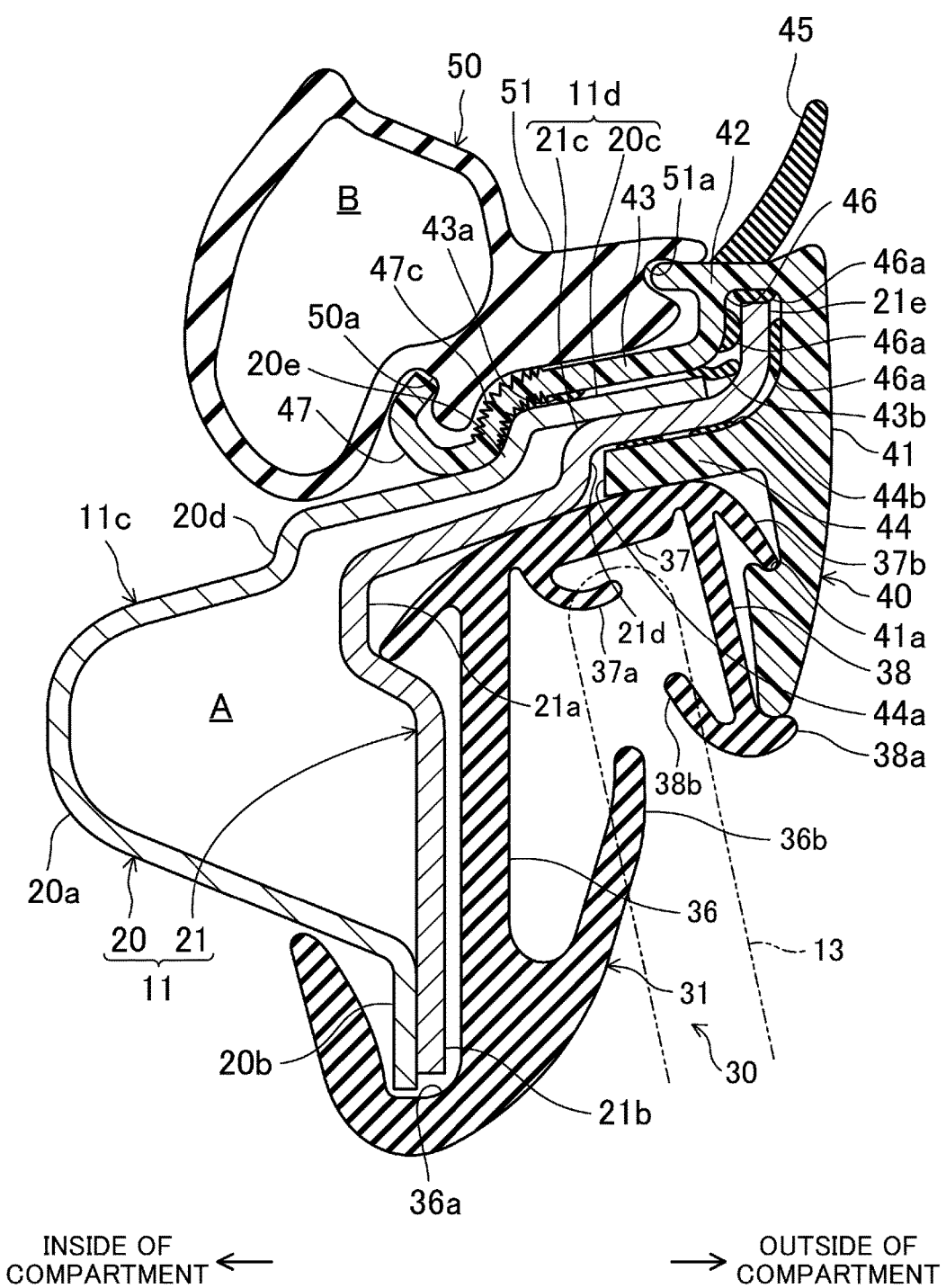
FIG. 4 is an illustration, corresponding to FIG. 2, according a second embodiment.

FIG. 4 illustrates a construction for securing a trim strip to an automotive door according to a second embodiment of the present disclosure. This second embodiment is different from the first embodiment in that, in the second embodiment, the engagement plate 43 of the trim strip 40 is provided with a transformable portion 47c to allow the engagement plate 43 to easily bend. Other than that, the second embodiment is the same as the first embodiment. Hence, the same elements as those in the first embodiment hereinafter have the same reference signs, and the description thereof shall be omitted. Description shall be given to a different element alone.

The transformable portion 47c is positioned near a portion at which the bending plate 47 of the engagement plate 43 is formed. The transformable portion 47c may allow the bending plate 47 to vertically bend at ease. The transformable portion 47c in this embodiment has fine asperity on an exterior face of the transformable portion 47c. Such asperity allows the transformable portion 47c to easily bend. The transformable portion 47c may easily enlarge the introduction opening 48 when the trim strip 40 is secured. Such a feature may improve workability when the outer protrusion 21e of the door flange 11d is fitted into the fit portion 46. Note that, for example, the transformable portion 47c may have a groove, a thin-walled portion, and a hole formed on the transformable portion 47c.

Similar to the features of the first embodiment, the features in the second embodiment may keep the trim strip 40 from moving away from a predetermined securing position, and simultaneously, reduce a risk of the trim strip 40 coming off. In addition, the features may improve workability when securing the trim strip 40 is secured.

Third Embodiment

Figure 5:
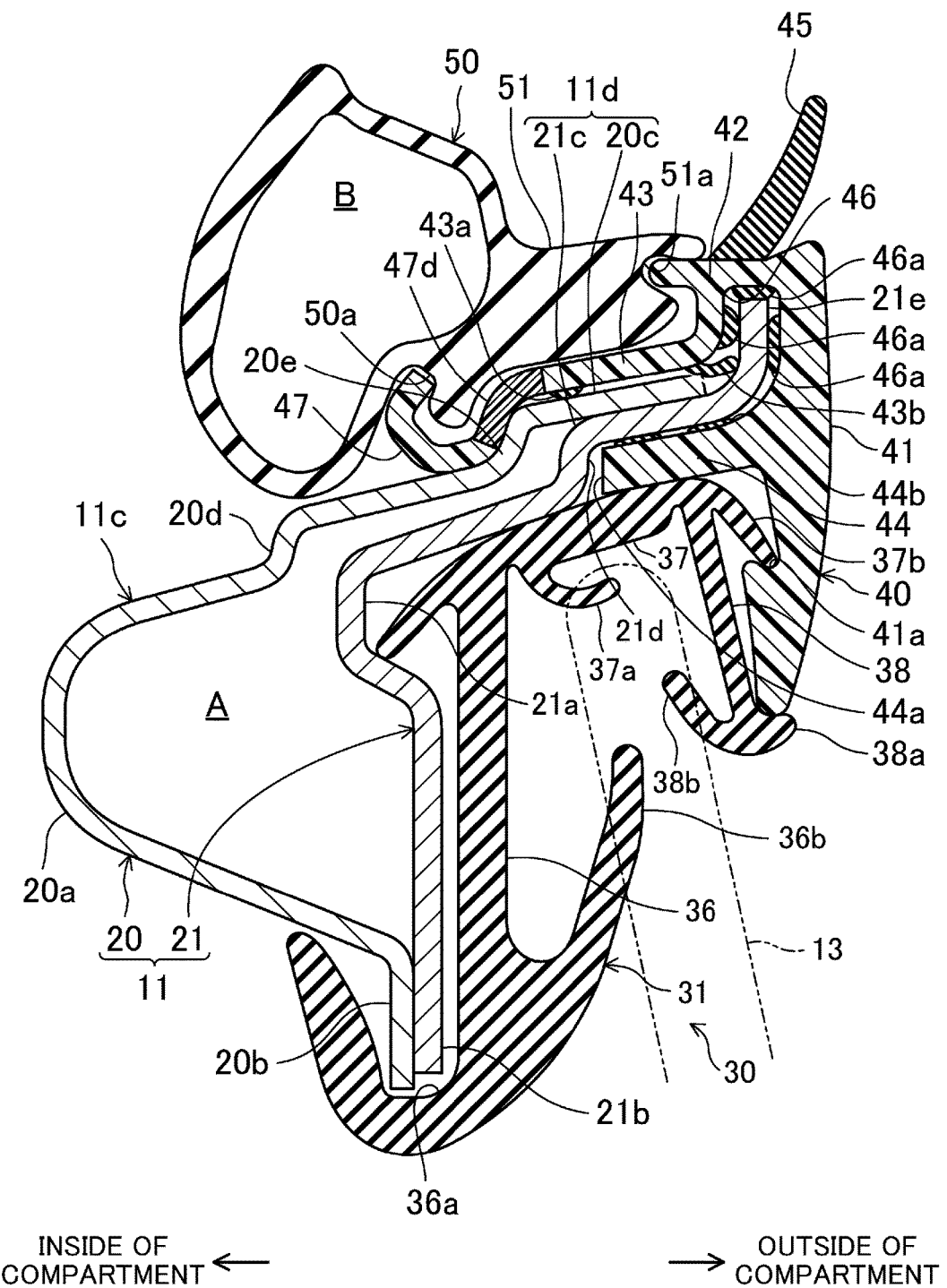
FIG. 5 is an illustration, corresponding to FIG. 2, according to a third embodiment.

FIG. 5 illustrates a construction for securing a trim strip to an automotive door according to a third embodiment of the present disclosure. This third embodiment is different from the first embodiment in that, in the third embodiment, the engagement plate 43 of the trim strip 40 is provided with a flexible portion 47*d* made of flexible resin. Other than that, the third embodiment is the same as the first embodiment. Hence, the same elements as those in the first embodiment have hereinafter the same reference signs, and the description thereof shall be omitted. Description shall be given to a different element alone.

The flexible portion 47*d* is positioned near a portion at which the bending plate 47 of the engagement plate 43 is formed. The flexible portion 47*d* and the engagement plate 43 are integrated into one. When flexible portion 47*d* is formed into a single piece with the engagement plate 43, integral molding of two materials may be used, for example. A material of the flexible portion 47*d* may be more flexible than a resin material forming another part of the trim strip 40. Examples of such material include TPO.

The flexible portion 47*c* allows the engagement plate 43 to vertically bend at ease. This may easily enlarge the introduction opening 48 when the trim strip 40 is secured, and improve workability when the outer protrusion 21*e* of the door flange 11*d* is fitted into the fit portion 46.

Similar to the features of the first embodiment, the features in the third embodiment may keep the trim strip 40 from moving away from a predetermined securing position, and simultaneously, reduce a risk of the trim strip 40 coming off. In addition, the features may improve workability when the trim strip 40 is secured. Moreover, an exterior face of the flexible portion 47*c* in the third embodiment may be provided with asperity as seen in the second embodiment.

Fourth Embodiment

Figure 6:
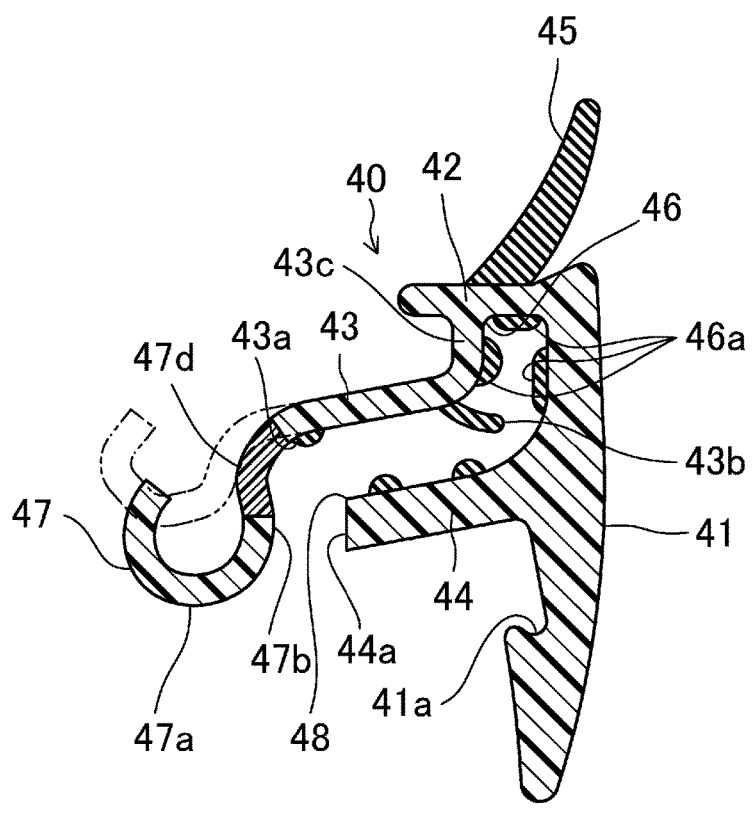
FIG. 6 is an illustration, corresponding to FIG. 3, according to a fourth embodiment.

FIG. 6 illustrates a fourth embodiment of the present disclosure. The chain double-dashed line illustrates a shape of the element shown in FIG. 5 and disclosed in the third embodiment. The fourth embodiment is different from the third embodiment in that, in the fourth embodiment, a portion, of the bending plate 47, ahead of the flexible portion 47*d* has been previously rotated in an obliquely downward direction of the body as illustrated in the solid line in FIG. 6 when the trim strip 40 is molded. When the trim strip 40 molded in this manner is secured to the window frame 11, repulsive force is generated. After the trim strip 40 is secured to the window flame 11, gripping force of the trim strip 40 to the window frame 11 further increases. This configuration may also be applied to the second embodiment shown in FIG. 4.

Note that in the first to the fourth embodiment the outer protrusion 21*e* is formed, as the outer protrusion of the door flange 11*d*, on an external end of the outer panel 21 with respect to the compartment. Instead, the outer protrusion may be formed on an end, of the inner panel 20, close to the outside of the compartment. An outer protrusion may be formed on ends, of both the inner panel 20 and the outer panel 21, close to the outside of the compartment.

The above embodiments are mere examples in all respects, and shall not be limited in interpretation. In addition, all the changes, including the shape, to the equivalents in the claims shall be within the scope of the present disclosure.

As can be seen, a construction for securing a trim strip of an automotive door according to the present disclosure may be applicable when the trim strip is secured to a front door and a rear door.

What is claimed is:

1. An assembly for securing a trim strip for an automotive door, the assembly comprising:
   a door flange provided to a window frame of the automotive door to protrude toward an outside of a compartment of a car;
   the trim strip secured to the door flange from the outside of the compartment
   an outer protrusion formed on an end of the door flange close to the outside of the compartment, the outer protrusion protruding upward;
   an upper step formed on a portion of an upper face of the door flange closer to a base end of the door flange than the end on which the outer protrusion is formed, the upper step positioning the upper face of the door flange higher to the outside of the compartment than to an inside of the compartment;
   an exterior appearance portion facing the outside of the compartment and creating an appearance;
   a fit portion, provided to an upper portion of the exterior appearance portion, into which the outer protrusion is inserted and fits;
   an engagement plate extending from the fit portion to the upper step, and engaging with the upper step; and
   a lower abutting portion extending from a portion of the exterior appearance portion, below the fit portion and abutting to a lower face of the door flange from below, wherein:
   the trim strip includes the exterior appearance portion, the fit portion, the engagement portion, and the lower abutting portion,
   a bending plate is formed on an end of the engagement plate close to an inside of the compartment, the bending plate being bent downward and then upward, the bending plate further engaging with the upper step, and
   a transformable portion is provided on a portion of the bending plate on the engagement plate close to an outside of the compartment, the transformable portion being configured to allow the bending plate to vertically bend.

2. The assembly of claim 1, further comprising:
   a lower step provided to the lower face of the door flange, the lower step being formed to position the lower face of the door flange higher to the outside of the compartment than to the inside of the compartment,
   wherein the lower abutting portion of the trim strip abuts to the lower step from the outside of the compartment.

3. The assembly of claim 1, further comprising a sealing protrusion provided to an interior surface of the fit portion of the trim strip, the sealing protrusion making contact with the door flange and sealing a gap between the interior surface and the door flange.

4. The assembly of claim 3, wherein the engagement portion of the trim strip is made of a hard resin material harder than the sealing protrusion.

5. The assembly of claim 1, further comprising a glass run secured to the trim strip, so that a circumferential edge of a window glass, disposed to freely rise and fall in the window frame, makes contact with the glass run.

6. The assembly of claim 1, further comprising an introduction opening formed between the engagement portion and the lower abutting portion of the trim strip, the introduction opening introducing the outer protrusion of the door flange into the fit portion.

7. The assembly of claim 1, wherein an exterior face of the transformable portion has asperity.

8. The assembly of claim 1, wherein a material of the transformable portion is more flexible than a material of the portion of the bending plate other than the transformable portion.

* * * * *